United States Patent
Takagishi et al.

(10) Patent No.: US 6,792,613 B2
(45) Date of Patent: Sep. 14, 2004

(54) OPTICAL INFORMATION RECORDING MEDIUM

(75) Inventors: Yoshikazu Takagishi, Fujioka (JP); Atsuo Shimizu, Saitama (JP); Ryuichi Sunagawa, Takasaki (JP); Keiichi Ida, Gunma (JP); Mitsuo Sekiguchi, Gunma (JP); Isao Matsuda, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 85 days.

(21) Appl. No.: 10/110,757

(22) PCT Filed: Feb. 14, 2001

(86) PCT No.: PCT/JP01/01021

§ 371 (c)(1),
(2), (4) Date: Apr. 17, 2002

(87) PCT Pub. No.: WO01/59780

PCT Pub. Date: Aug. 16, 2001

(65) Prior Publication Data

US 2002/0154595 A1 Oct. 24, 2002

(30) Foreign Application Priority Data

Feb. 14, 2000 (JP) ............................. 2000-35288

(51) Int. Cl.[7] ................................. G11B 7/24
(52) U.S. Cl. .................................... 720/418
(58) Field of Search ............... 369/277, 13.55, 369/275.1, 275.3, 275.4

(56) References Cited

U.S. PATENT DOCUMENTS 4,931,336 A * 6/1990 Haneda ..................... 428/64.4
6,051,299 A * 4/2000 Uchiyama et al. .......... 428/65.3
6,254,966 B1 * 7/2001 Kondo ....................... 428/156
6,288,998 B1 * 9/2001 Taira ........................ 369/275.4
2002/0054563 A1 * 5/2002 Yamaoka et al. .......... 369/275.4

FOREIGN PATENT DOCUMENTS

| JP | 4-182946 | 6/1992 |
|----|----------|--------|
| JP | 4-358331 | 12/1992 |
| JP | 9-7232 | 1/1997 |
| JP | 9-293274 | 11/1997 |
| JP | 10-181203 | 7/1998 |

OTHER PUBLICATIONS

Japanese Patent Office Action, titled "Refusing Reason Notice" (2 pages), mailed on Dec. 9, 2003 for a counterpart foreign application, and its English translation.

* cited by examiner

*Primary Examiner*—George J. Letscher
*Assistant Examiner*—Mark Blouin
(74) *Attorney, Agent, or Firm*—Finnegan, Henderson, Farabow, Garrett & Dunner, L.L.P.

(57) ABSTRACT

An optical information recording medium recordable at a high density two times or more higher than that of currently-used CD-Rs by devising the shape of a pregroove is provided. It is provided with a recording layer formed on a transparent substrate having a spiral pregroove formed thereon, wherein a track pitch Tp of the pregroove is $1.0 \mu m \leq Tp \leq 1.2 \mu m$ and an inclination angle Ga of sidewalls of the pregroove is $30° \leq Ga \leq 70°$.

2 Claims, 7 Drawing Sheets

ENLARGED DIAGRAM OF ESSENTIAL PART
OF OPTICAL INFORMATION RECORDING MEDIUM

FIG. 1

GENERAL STRUCTURAL DIAGRAM OF OPTICAL
IMFORMATION RECORDING MEDIUM

FIG. 2

ENLARGED DIAGRAM OF ESSENTIAL PART OF OPTICAL INFORMATION RECORDING MEDIUM

INCLINATION ANGLE 45°

INCLINATION ANGLE 80°

OPTICAL INFORMATION RECORDING MEDIUM

TECHNICAL FIELD

The present invention relates to an optical information recording medium of once type such as a CD-R (Compact Disc-Recordable), and more particularly to an optical information recording medium recordable at a high density two times or more higher than that of currently-used CD-Rs.

BACKGROUND ART

Generally, a CD-R is known as an optical information recording medium of write-once type which is reproduced by a CD (Compact Disc) drive or a CD-ROM (Compact Disc Read Only Memory) drive.

The optical recording medium such as a CD-R has a basic structure in which a recording layer having an organic dye film is formed on a transparent substrate having a spiral pregroove, a reflecting layer of a metallic film is formed thereon, and further a protective layer of an ultraviolet curing resin is formed thereon, and is configured to record by irradiating a laser beam from the side of the transparent substrate to the recording layer to partly decompose the dye of the recording layer.

This optical information recording medium is expanding its market rapidly because of merits such as compatibility with CDs and a unit cost per bit lower than that of paper, and recording apparatuses, which can write at a recording speed ten times or more higher than an ordinary speed, and corresponding media are being supplied to the market in response to needs for high-speed processing.

Furthermore, it is demanded on the market that a high capacity is provided in correspondence with an increasing amount of data processing every year, and it is assumed that a capacity of 1.3 GB (Giga Bytes) or more is required for an amount of data for image processing or the like.

When the above pits are recorded by means of a laser beam having a wavelength of 780 nm, NA (Numerical Aperture) of 0.45 to 0.50 and a spot diameter of about 1.6 $\mu$m employed in the current CD-ROM/-R/-RW drives in order to secure a recording amount of about two times of the currently used ones without changing an outer diameter of conventional optical information recording media of write once type, there are problems as described below.

Specifically, when a tracking pitch is simply changed to have a smaller interval, unwanted signals are taken from an adjacent track when reproducing, namely so-called crosstalk increases, and a clear signal cannot be obtained, resulting in increase of so-called jitter which is the variation in the pit signal at the time of reproduction.

When the recording pits are merely configured to be formed in high density in a linear velocity direction, an effect of heat generated when the pits are formed causes a phenomenon which is called heat interference affecting on the recording state of the next pit, a length of the previously recorded pit and an interval to the next pit become short, so that a position of the next written pit is easily displaced. As a result, a jitter becomes worse. This phenomenon is also seen when recording at a high speed.

DISCLOSURE OF THE INVENTION

It is an object of the present invention to provide an optical information recording medium recordable at a high density two times or more higher than that of currently-used CD-Rs by devising a shape of the pregroove.

The optical information recording medium according to the present invention has a recording layer formed on a transparent substrate having a spiral pregroove formed thereon, wherein a track pitch Tp of the pregroove is 1.0 $\mu$m $\leq$ Tp $\leq$ 1.2 $\mu$m; and an inclination angle Ga of the sidewalls of the pregroove is 30° $\leq$ Ga $\leq$ 70°.

When the inclination angle Ga of the sidewalls of the pregroove is less than 30°, a sufficient push-pull voltage amplitude cannot be obtained, so that a wobbling voltage amplitude is small, ATER is accordingly caused, and a trouble is caused in tracking when recording.

When the inclination angle Ga of the sidewalls of the pregroove 201 exceeds 70°, the entry of the adjacent track into an edge of a spot increases an amount of crosstalk, leading to worsening of jitter because a portion having a phase difference larger than that when the inclination is not larger than 70° enters into the spot.

It is desirable that a half-width Gw of the pregroove is in a range of 0.25 $\mu$m $\leq$ Gw $\leq$ 0.50 $\mu$m. The half value width Gw of the pregroove is a width at a position with a half of the depth Gd of the pregroove. When the half value width Gw of the pregroove exceeds 0.50 $\mu$m, a pit width Pw increases when recording, and an effect of crosstalk increases, and when it is less than 0.25 $\mu$m, it is necessary to increase the laser power required for recording, and sufficient reproduction modulation cannot be obtained, resulting in an increase of a block error rate which is a reproduction signal error value.

It is preferable that a depth Gd of the pregroove is determined to 100 nm $\leq$ Gd $\leq$ 300 nm. When the depth Gd of the pregroove is less than 100 nm, tracking becomes difficult, and when the depth Gd of the groove exceeds 300 nm, injection molding of the pregroove becomes difficult.

A width Lw of the land formed between the pregrooves is preferably determined to Lw $\geq$ 0.6 $\mu$m. The width Lw of the pregroove is defined by a difference Td-Gw between a track pitch Td and the half value width Gw of the pregroove, and when the width Lw of the land is less than 0.6 $\mu$m, crosstalk increases, and jitter becomes large.

A wobbling amplitude Wamp of the pregroove is preferably determined to a range of 20 nm $\leq$ Wamp $\leq$ 45 nm. In this type of optical information recording medium, the pregroove is wobbling, and it is configured to record information by detecting an absolute time according to the wobbling signal obtained from the wobbling shape, but when the wobbling amplitude Wamp of the pregroove is less than 20 nm, the wobbling signal becomes small and tracking is difficult when recording, and when the wobbling amplitude Wamp of the pregroove exceeds 45 nm, the wobbling signal has a problem of crosstalk, and tracking becomes difficult when recording.

BEST MODE FOR CARRYING OUT THE INVENTION

A mode of implementation of the optical information recording medium according to the present invention will be described in detail with reference to the accompanying drawings.

Figure 1:
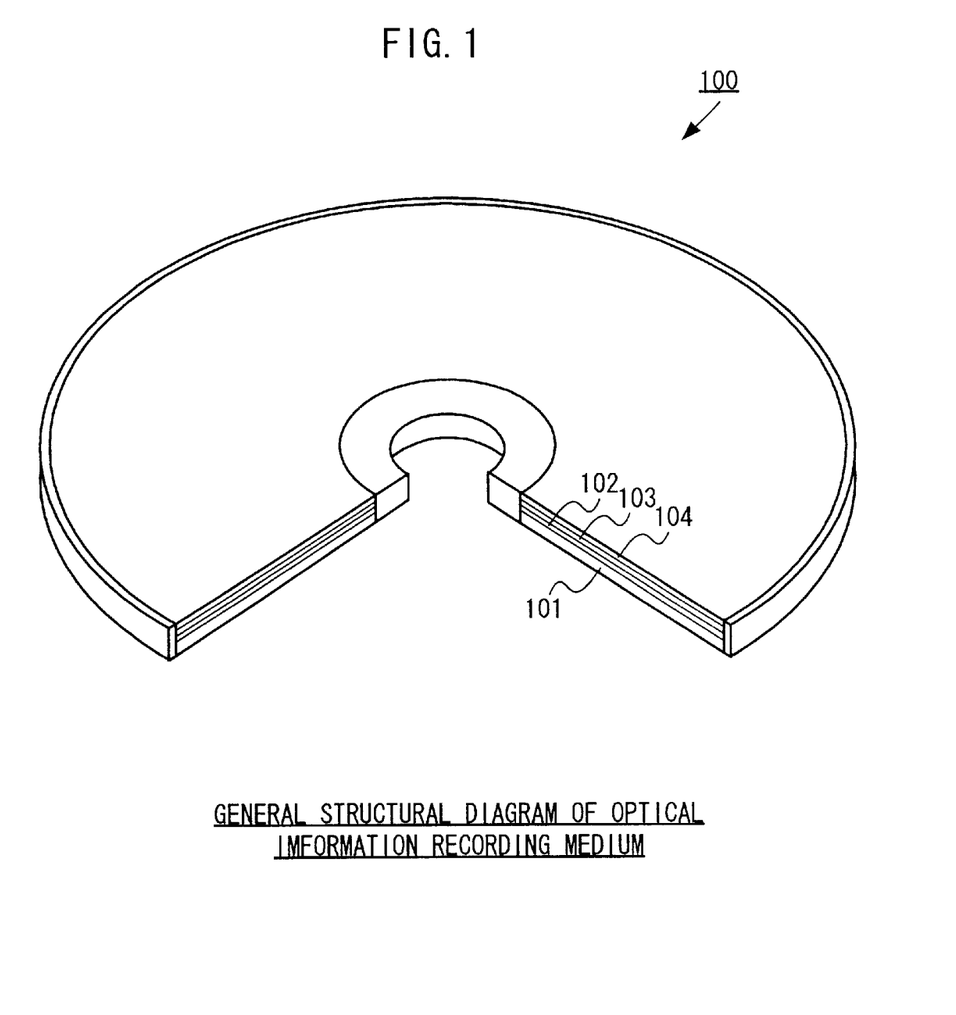
FIG. 1 is a perspective diagram partly broken away of a general structure of an optical information recording medium according to the present invention.
Figure 2:
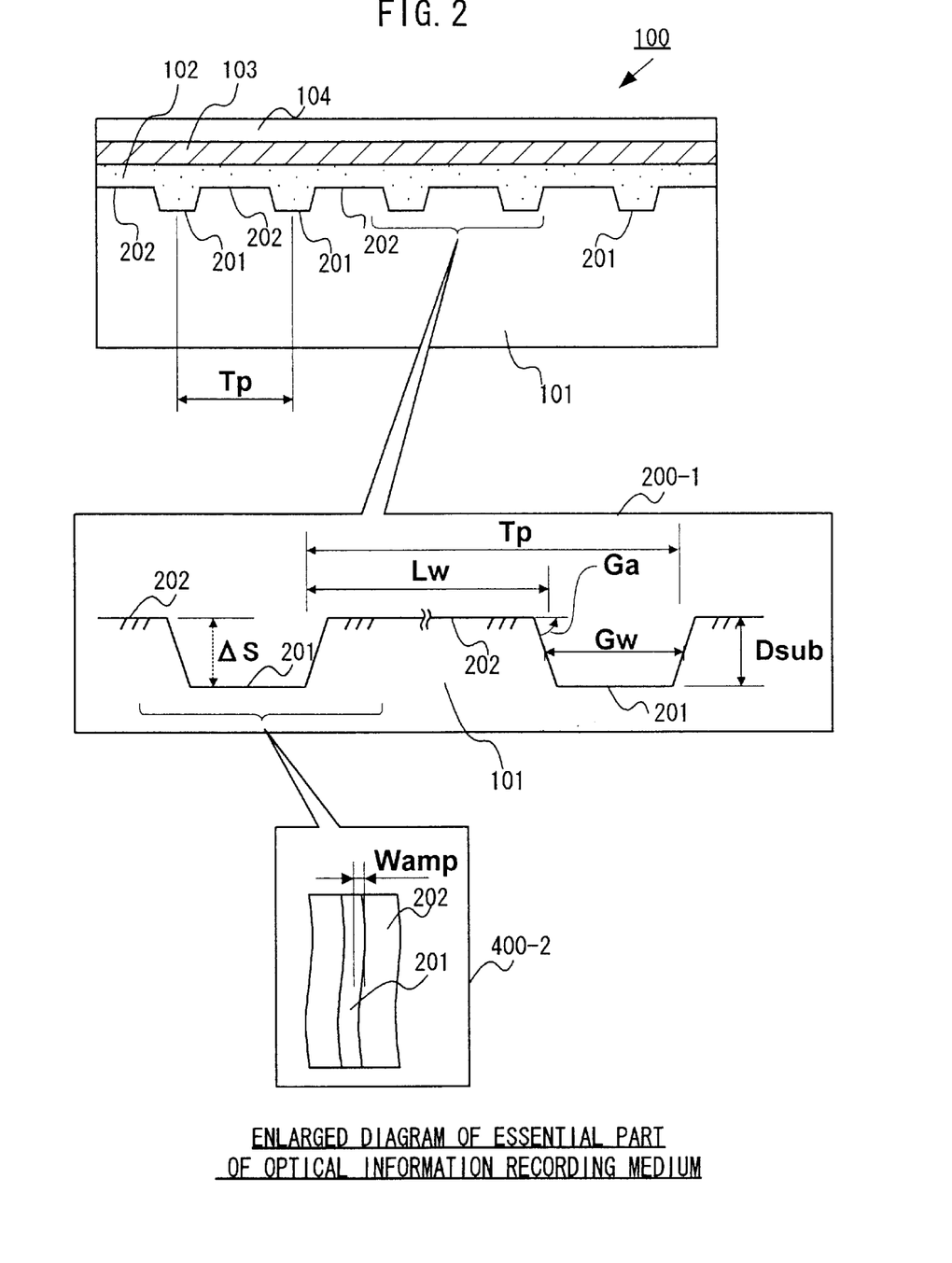
FIG. 2 is an enlarged sectional diagram showing an essential part of the optical information recording medium shown in FIG. 1.

FIG. 1 is a perspective diagram partly broken away of a general structure of the optical information recording medium according to the present invention, and FIG. 2 is an enlarged sectional diagram showing an essential part of the optical information recording medium shown in FIG. 1.

In FIG. 2, the sectional diagram of the optical information recording medium of FIG. 1 taken in its radial direction is shown, wherein block 200-1 shows an enlarged view of a groove section and a land section, and in block 400-2, Wamp shows an wobbling amplitude.

In FIG. 1 and FIG. 2, an optical information recording medium 100 is formed by forming a recording layer 102, which is formed of an organic dye film, on a transparent substrate 101 by a film-forming method, e.g., a spin-coating method or the like, forming a reflecting layer 103 on the recording layer 102 by a sputtering method, a vapor deposition method or a plasma CVD (Chemical Vapor Deposition) method, and forming a protective layer 104 on the reflecting layer 103.

Here, a spiral pregroove 201 is formed on the transparent substrate 101, and the spiral pregroove 201 can be formed by an injection forming method, which injection-forms the spiral pregroove 201 by means of a stamper. The spiral pregroove 201 may be formed by another forming method other than the stamper.

A material for the transparent substrate 101 can be various materials which have high permeability to light having a wavelength of the laser beam used for recording and reproducing of information on and from the optical information recording medium 100 and are not deformed considerably by an external force, an environmental change, or the like, and polycarbonate can be used for example.

The organic dye film forming the recording layer 102 can be a dye material alone or one containing a prescribed amount of a stabilizing material in order to improve environmental stability.

The dye material includes those which have a high refractive index and an appropriate optical absorption coefficient in the vicinity of a wavelength of 770 nm to 830 nm of the laser beam used to record and reproduce information on and from the optical information recording medium 100. For example, cyanine dye, metal-containing phthalocyanine dye, metal-containing azo dye or the like can be used, and as the optical information recording medium 100 of this mode of implementation, it is desirable to use benzoindodicarbo cyanine dye as the aforementioned dye material.

The reflecting layer 103 is a metallic film which mainly contains Au, Ag, Cu, Pd, Al, or an alloy of them and also a prescribed amount of other elements.

In the optical information recording medium 100 of this mode of implementation, in order to realize a recording capacity of 1.3 GB or more without changing the outer diameter of currently-used CD-Rs, a track pitch Tp is determined to a range of 1.0 $\mu m \leq Tp \leq 1.2$ $\mu m$, and the pregroove 201 is formed on the transparent substrate 101 of the optical information recording medium 100 in such a way to meet the track pitch Tp.

Here, the track pitch Tp is determined by an interval between the adjacent pregrooves 201, namely a distance between the centers of the adjacent pregrooves 201 as shown in FIG. 2.

When the track pitch Tp is less than 1.0 $\mu m$, jitter becomes 35 ns or more due to an effect of crosstalk, and the stable recording-reproducing properties can not be obtained. Jitter of less than 35 ns is a value specified by the CD-R Standard, Orange Book Ver. 2.0.

When the track pitch Tp exceeds 1.2 $\mu m$, a linear velocity of 0.77 m/s or more is required on the side of a recording device in order to achieve a capacity of about 1.3 GB, and the stable recording-reproducing properties can not be obtained due to heat interference.

Here, for the optical information recording medium 100 having the aforementioned track pitch, a shape of the pregroove formed on the transparent substrate 101 is significant.

Figure 3A:
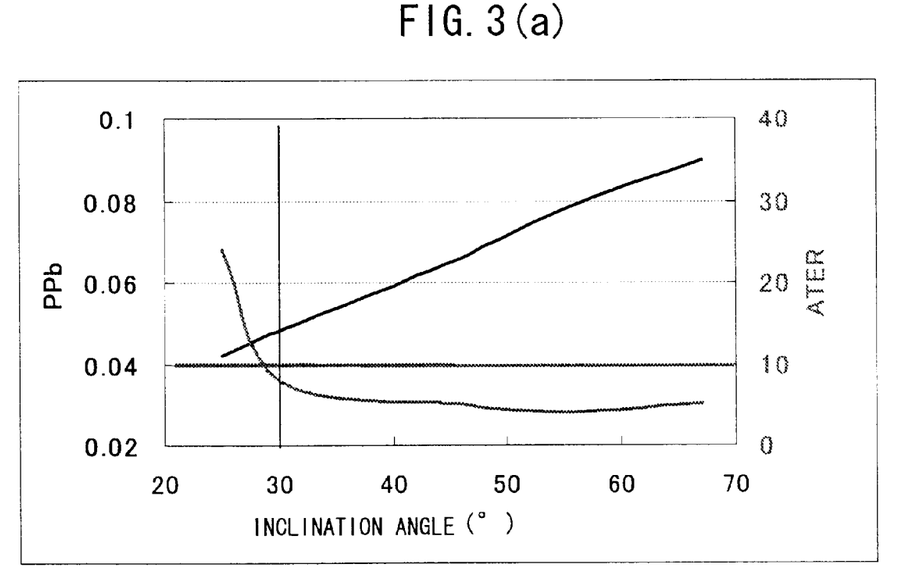
FIG. 3 is a diagram showing a prescribed standard of a lower limit of Ga.
Figure 3B:
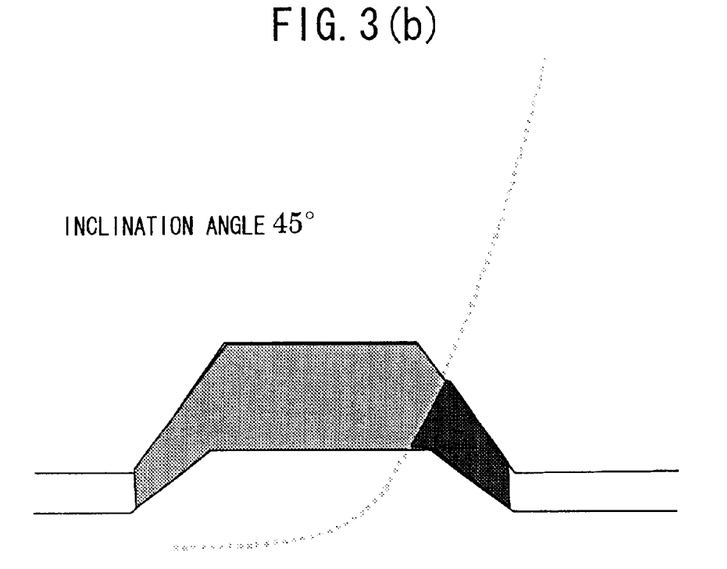

An inclination angle Ga of the sidewalls of the pregroove 201 is formed in a range of $30° \leq Ga \leq 70°$. When the inclination angle Ga of the sidewalls of the pregroove 201 is less than 30°, a sufficient push-pull voltage amplitude cannot be obtained, so that a wobbling voltage amplitude is small, ATER is accordingly caused by 10% or more specified by the CD-R standard, and a trouble is caused in tracking when recording. Such a state is shown in FIGS. 3(a) and (b). FIG. 3(b) is a diagram conceptually showing a leak-in amount of a spot into the adjacent track.

Figure 4A:
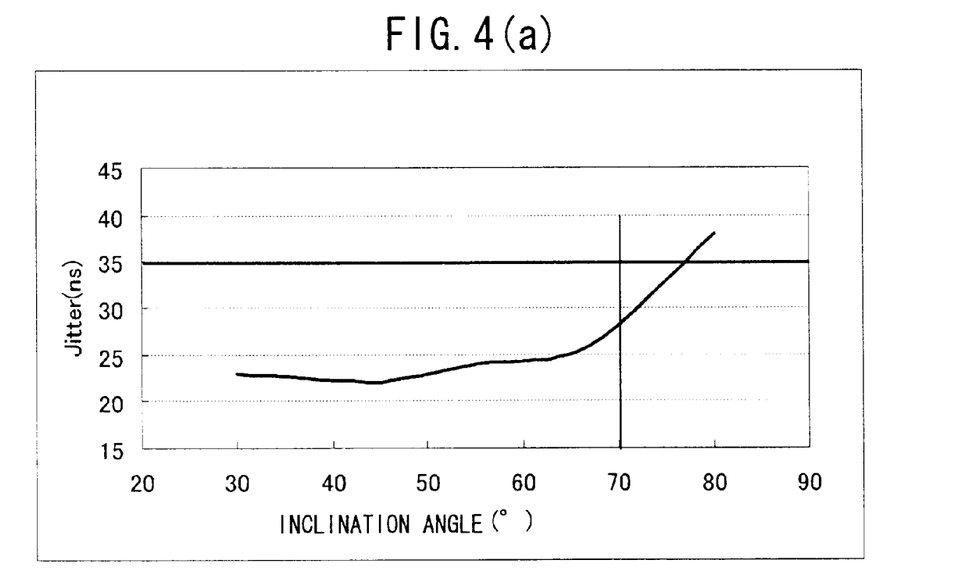
FIG. 4 is a diagram showing a prescribed standard of an upper limit of Ga.
Figure 4B:
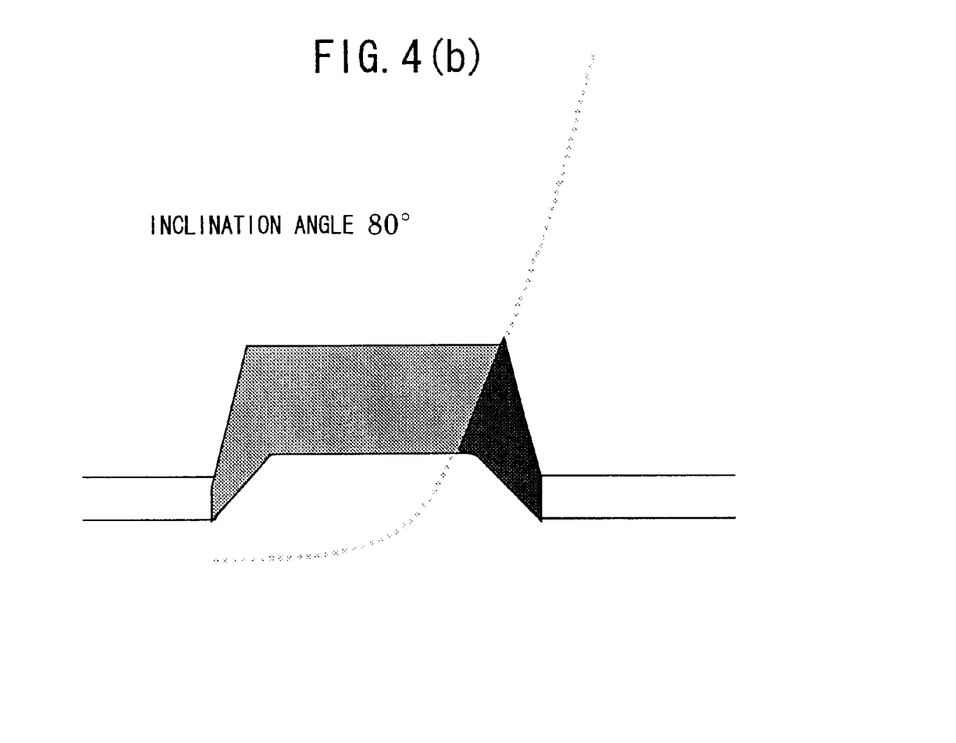

When the inclination angle Ga of the sidewalls of the pregroove 201 exceeds 70°, the entry of the adjacent track into the edge of the spot increases an amount of crosstalk, leading to worsening of jitter because a portion having a phase difference larger than when the inclination is 70° or less enters into the spot. Such a state is shown in FIGS. 4(a) and (b). FIG. 4(b) is a diagram conceptually showing a leak-in amount of the spot into the adjacent track.

Figure 5:
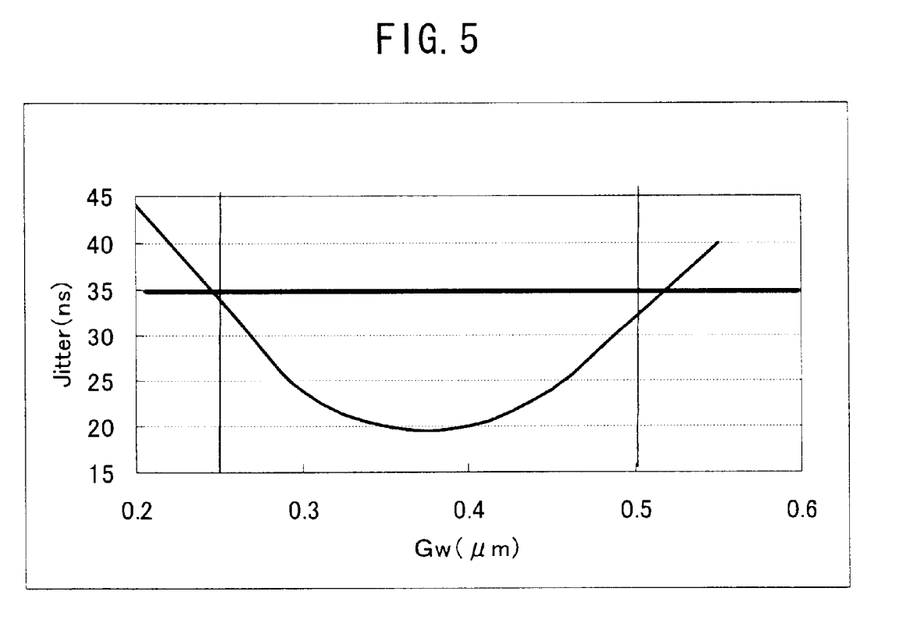
FIG. 5 is a diagram showing a prescribed standard of an upper limit of Gw.

It is desirable that a groove-half value width Gw is set in a range of $0.25 \mu m \leq Gw \leq 0.50$ $\mu m$. As shown in FIG. 5, a prescribed standard of Gw is less than jitter of 35 nm.

Figure 6:
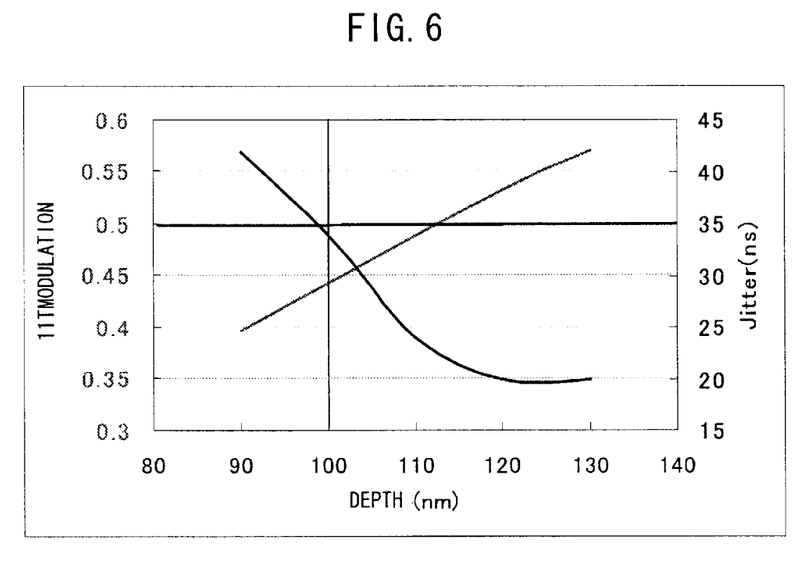
FIG. 6 is a diagram showing a prescribed standard of a lower limit of Gd.
Figure 7:
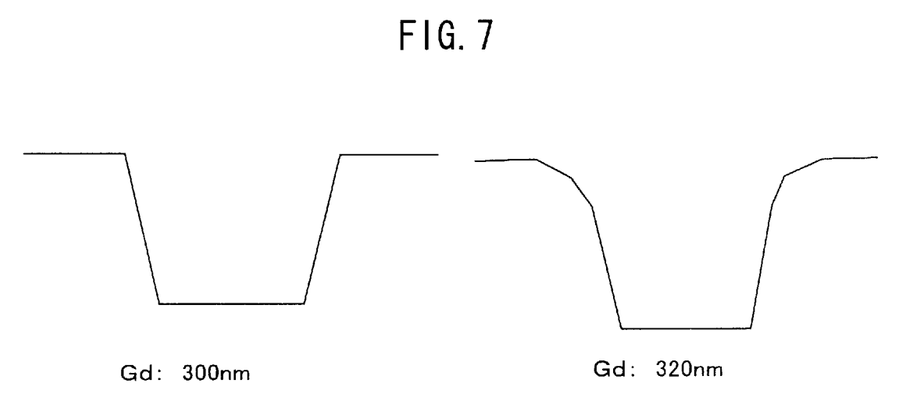
FIG. 7 is a diagram showing a prescribed standard of an upper limit of Gd.

A groove depth Gd is desirably determined to a range of 100 nm $\leq Gd \leq 300$ nm. As shown in FIG. 6, when it is less than 100 nm, a dye thickness Dg in the groove cannot be obtained, and modulation is small, resulting in an increase of jitter. A lower limit value of Gd is determined with jitter of less than 35 ns as a standard. As shown in FIG. 7, an upper limit value of Gd is determined to a value with which injection molding can be made. When Gd exceeds 300 nm, it is hard to conduct injection molding under conditions of track pitch Tp of 1.0 $\mu m \leq Tp \leq 1.2$ $\mu m$, and groove-half value width Gw of 0.25 $\mu m \leq Gw \leq 0.50$ $\mu m$.

Figure 8:
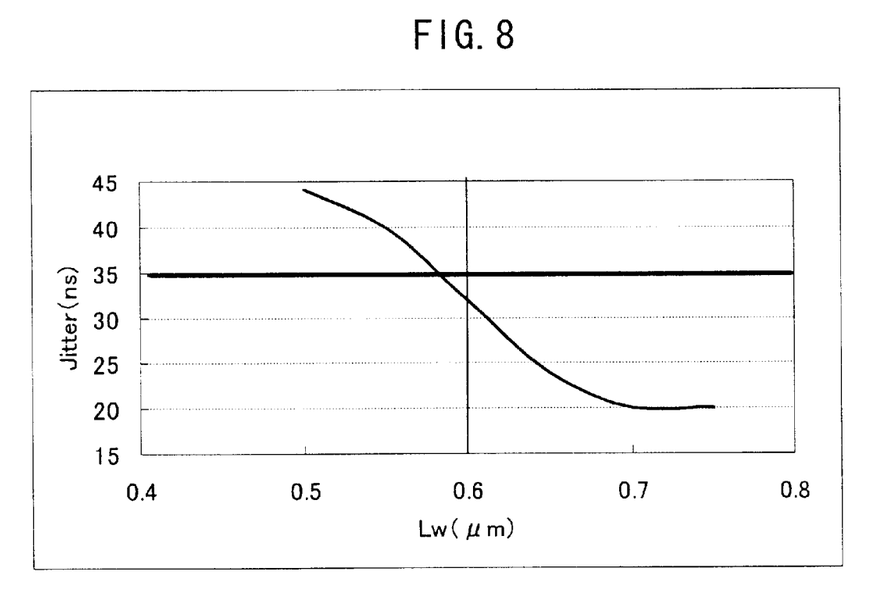
FIG. 8 is a diagram showing a prescribed standard of Lw.

Land width Lw of a land 202 formed between the pregrooves 201 is preferably set to a range of Lw $\geq 0.6$ $\mu m$. As shown in FIG. 8, Lw is determined with jitter of less than 35 ns as a standard.

Here, the land width Lw is an effective width Lw of the land 202 formed between the pregroove 201 and its adjacent pregroove 201, namely a length which is determined by subtracting the groove-half value width Gw from the track pitch Tp, and when this land width Lw is less than 0.6 μm, crosstalk increases and jitter increases, so that stable recording-reproducing properties cannot be realized.

Figure 9:
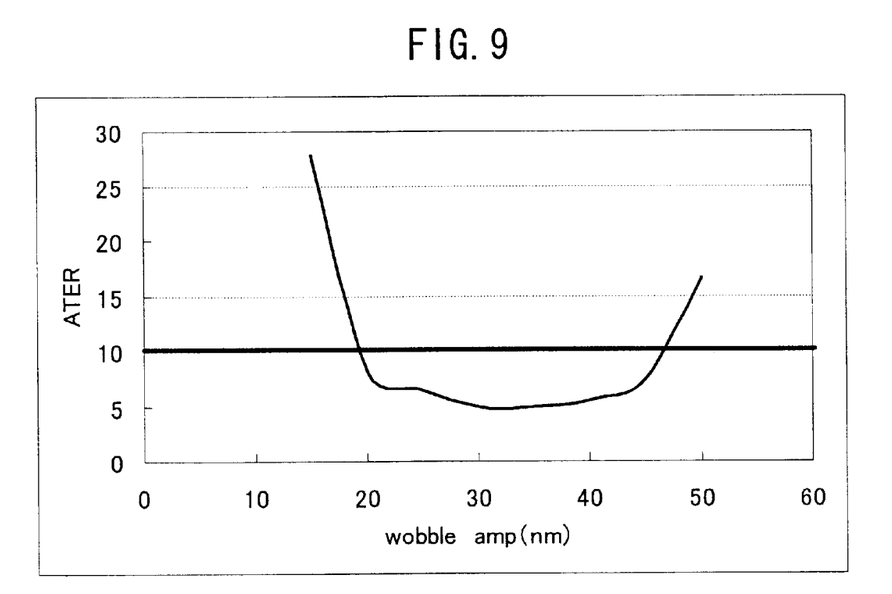
FIG. 9 is a diagram showing a prescribed standard of Wamp.

The wobbling amplitude Wamp formed by the pregroove 201 is preferably determined to a range of 20 nm≦Wamp≦45 nm. When the wobbling amplitude Wamp is less than 20 nm, a wobbling signal is small, and when the wobbling amplitude Wamp exceeds 45 nm, the wobbling signal has a problem of crosstalk, ATER exceeds 10% which is specified by the CD-R standard, and tracking becomes difficult when recording. This state is shown in FIG. 9.

Industrial Applicability

The present invention can realize an optical information recording medium having a recording capacity two times or more higher than that of currently-used CD-Rs by devising a shape of a pregroove without changing an outer diameter of the currently-used CR-Rs and can provide an optical information recording medium recordable at a high density two times or more higher than that of currently-used CD-Rs, which can comply with the high capacity in order to deal with the increasing amount of data processing every year.

What is claimed is:

1. An optical information recording medium having a recording layer formed on a transparent substrate having a spiral pregroove formed thereon, wherein:
    a track pitch Tp of the pregroove is 1.0 μm≦Tp≦1.2 μm;
    a half-width Gw of the pregroove is 0.25 μm≦Gw≦0.50 μm;
    a depth Gd of the pregroove is 100 nm≦Ga≦300 nm; and
    a width Lw of a land formed between the pregrooves is Lw≧0.6 μm.

2. An optical information recording medium having a recording layer formed on a transparent substrate having a spiral pregroove formed thereon, wherein a track pitch Tp of the pregroove is 1.0 μm≦Tp≦1.2 μm, an inclination angle Ga of sidewalls of the pregroove is 30°≦Ga≦70°, a half-width Gw of the pregroove is 0.25 μm≦Gw≦0.50μm, a depth Gd of the pregroove is 100 nm≦Gd≦300 nm, a width Lw of a land formed between the pregrooves is Lw≧0.6 μm, and a wobbling amplitude Wamp of the pregroove is 20 nm≦Wamp≦45 nm.

* * * * *